Figure 1:
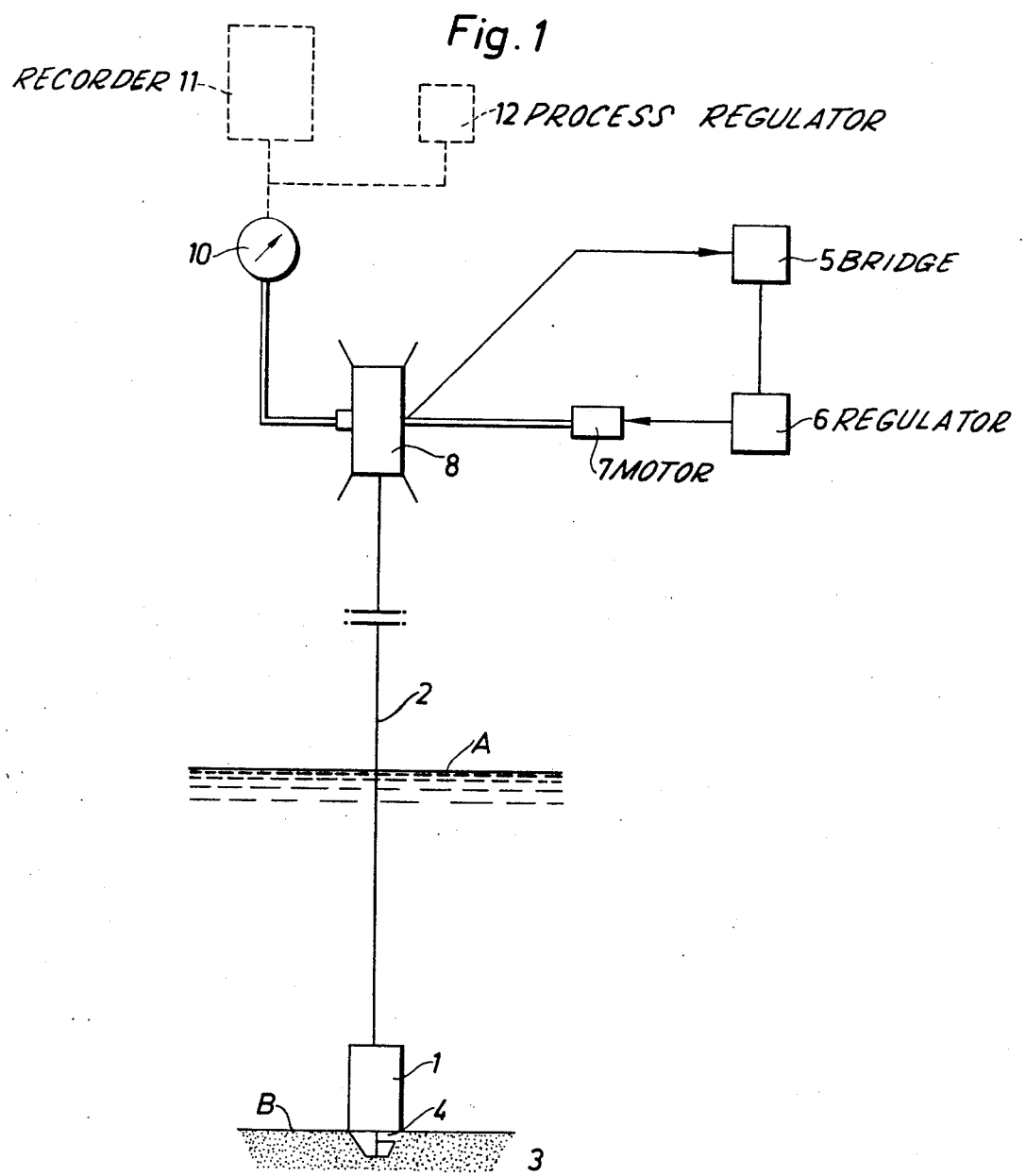

United States Patent [19]
Lindberg

[11] 3,814,930
[45] June 4, 1974

[54] DETERMINING AND FOLLOWING A SEDIMENTATION LEVEL BY OPTICAL MEASUREMENT

[76] Inventor: Arne Robert Lindberg, Slingergatan 18, 431 39 Molndal, Sweden

[22] Filed: Nov. 5, 1970

[21] Appl. No.: 87,077

[52] U.S. Cl................. 250/218, 73/170 A, 356/72, 356/208
[51] Int. Cl. .......................................... G01n 21/26
[58] Field of Search .......... 73/321, 170 A; 356/208, 356/72; 250/218

[56] References Cited
UNITED STATES PATENTS

| | | | |
|---|---|---|---|
| 871,124 | 11/1907 | Knoblock et al................ | 73/321 UX |
| 2,750,794 | 6/1956 | Downs.............................. | 73/170 A |
| 2,991,688 | 7/1961 | Schneider, Jr..................... | 250/218 |
| 3,319,514 | 5/1967 | McAllister, Jr..................... | 356/208 |
| 3,417,251 | 12/1968 | Leonard et al. ....................... | 356/72 |
| 3,448,277 | 3/1969 | Jayko................................. | 356/208 |

Primary Examiner—Richard C. Queisser
Assistant Examiner—Daniel M. Yasich
Attorney, Agent, or Firm—Albert M. Parker

[57] ABSTRACT

The present invention relates to a method and a device for determining the location of a predetermined sedimentation content at various depths in liquid media present in sedimentation pools, dams and the like. According to the invention the actual value of various sedimentation levels in said liquid is continuously compared with a predetermined desired value set on a regulator, whereby the measuring device during the entire measuring process automatically seeks and follows the depth in the medium corresponding to the predetermined value so that the immersion depth of the device indicates the level at which the predetermined content is present.

6 Claims, 6 Drawing Figures

DETERMINING AND FOLLOWING A SEDIMENTATION LEVEL BY OPTICAL MEASUREMENT

The present invention relates to a method and means for determining the sedimentation content at various depths in liquid media and can be used with advantage for continuously determining the level of a predetermined sedimentation content in liquids in sedimentation pools, dams and the like, where there is a concentration gradient or layer formation with respect to the content of suspended or sedimented material.

In processes with sedimentation or floatation, it is often of great value to be able to follow the separation process, especially the depth of sedimentation in the pools, in order to provide for an automatic regulation of the charging and discharging of the separation means. Previously the sedimentation gradient has normally been determined by manual tests, which is of course a definite disadvantage.

The object of the present invention is to effect automatic measurement of the sedimentation gradient, thus enabling automatic regulation of the operation of, for example, separation plants for sedimentation. In accordance with the present invention a measuring device automatically seeks a previously determined sedimentation content in the medium, which sedimentation content has been set in advance on a regulator cooperating with the measuring device and, by means of continuous measurements, the device of the invention follows the location of this sedimentation content in the medium, constantly rising and sinking correspondingly in the medium so that during the entire measuring process the measuring device automatically assumes the depth in the medium corresponding to the sedimentation content set in advance on the regulator. The immersion depth of the device indicates the level at which the sedimentation content previously determined is present.

The method according to the present invention can suitably be carried out with apparatus comprising a measuring device arranged to optically continuously register the sedimentation content in the medium being examined. The measuring device of the invention includes a light source for directing a ray of light into a measuring space in the device. The measuring space constitutes an opening through which passes a sample of the medium being examined. A screening member is positioned between the light source and the measuring space or opening to intermittently screen off the ray of light from the opening and the medium therein. A photo-sensitive electric element registers the light reflected from the medium in the opening and signals from the photoelectric element are alternately fed to a measuring bridge circuit. The bridge circuit has one part for producing a signal current corresponding to the intensity of reflected light impinging on the photo-electric element. a regulator cooperates with the measuring circuit for comparing the actual measured values signalled by the measuring part of the circuit with an adjustably set reference value corresponding to a desired opacity of the medium. The regulator continuously compares the signals from the photo-electric element with the reference value. The measuring device is raised or lowered to a depth in the medium at which the actual signal and reference value correspond by means of a cable or the like supporting the device. The raising or lowering movement is actuated by the regulator. The regulator thus compares the actual measurement signal to the reference value and emits a signal corresponding to the difference between these two inputs, and the resultant difference signal emitted controls a mechanism for raising or lowering the measuring device until the regulator inputs match.

Figure 2:
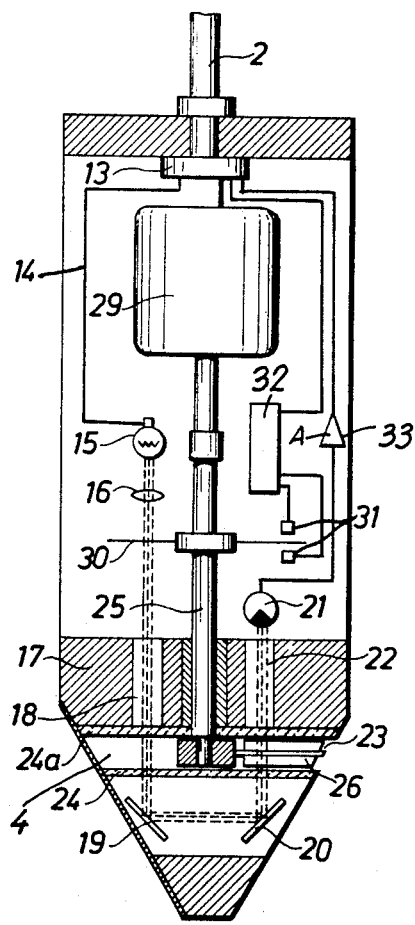
Figure 3A:
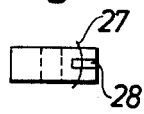
Figure 3B:
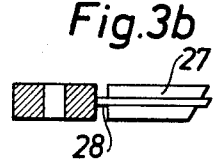
Figure 3C:
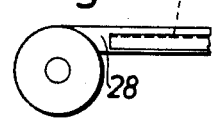
Figure 4:
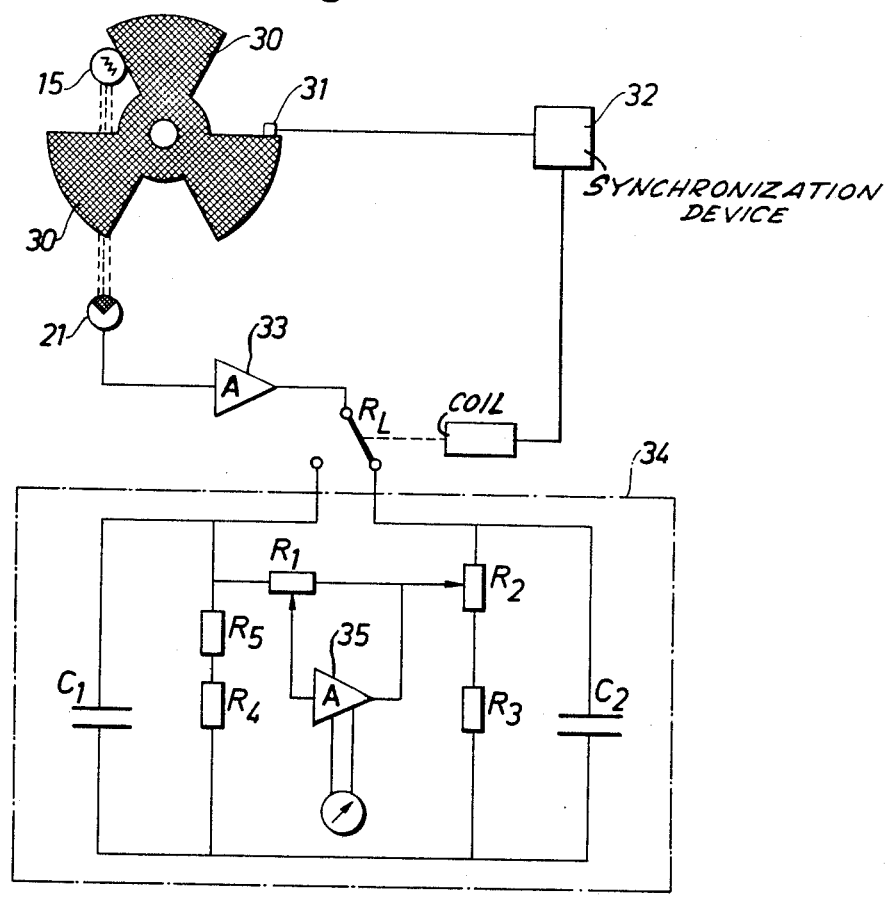

The invention will be further described in the following with reference to the accompanying drawings in which FIG. 1 shows a diagrammatic sketch of a device according to the invention, FIG. 2 shows a longitudinal section through the measuring device used, FIGS. 3a – 3c show the pump blades in the measuring device, in three different planes, FIG. 4 shows the principles of the invention by means of an illustrative block diagram of the electronic equipment included.

FiG. 1 illustrates the principle of the invention as used for continuously determining the location of a sedimentation level in a sedimentation pool. 1 designates a measuring device in the form of a plunger which can be raised or lowered by means of a cable 2. The measuring device 1 is, as described in more detail below, provided with a pump means which transports a medium 3 to be examined through a measuring gap or opening 4 into the device 1, whereupon the sedimentation content in the medium is analysed optically with the help of a photo-electric element. The signal obtained from the photo-electric element is then sensed in a differential bridge 5 with measuring amplifier, which transfers the measured value (actual value) to a regulator 6 which in turn compares this value with a desired value set in advance. If there is a difference between the actual and the desired values, the regulator 6 emits a signal to a positioning motor 7 which turns a cable drum 8 taking up the cable 2 of the measuring device, so that the measuring device is raised or lowered according to the deviation sign. This adjustment of the depth of the plunger continues until the actual value agrees with the desired value. On the cable drum 8 is a position indicator, the output signal of which can be indicated on a pointer 10, a recording element 11 and may be connected possibly to a process regulator 12. A designates the liquid level and B the sedimentation level.

The structure of the measuring device used is seen in FIG. 2. The electric cable 2 which is used both to raise and lower the measuring device is fitted in-side the measuring device to an electricity terminal device 13 which, via a conduit 14 feeds a light source 15. The light source 15 sends, via a lens system 16, a light bundle through a light shaft 18 arranged in a bearing block 17, via the measuring gap 4 to a slanting mirror 19. From here the light bundle is reflected to a second slanting mirror 20 opposite. The mirror 20 directs the bundle of rays towards a photo-electric element 21 through a second light shaft 22 in the bearing block 17. The light bundle thus passes the measuring gap 4 for the second time, this gap communicating with the liquid medium 3 via a side opening 23 in the measuring device. Above the mirrors 19, 20 are two glass plates 24, 24a spaced from each other, which form the lower and upper limits of the measuring gap 4. In the measuring gap 4 is a pump means in the form of one or more pump blades 26 arranged rotatably on a central shaft 25. As can be seen more clearly in FIGS. 3a – 3c, the pump blades 26 may suitably have a rigid blade 28, with its plane in the direction of rotation and a rubber, plastic or soft metal blade 27 attached at right angles to the first blade in a longitudinal slit 28a. The width of the latter blade 27 is such that it wipes along the glass plates 24, 24a and cleans them. The rotation of the shaft 25 is effected by means of a motor 29. Between the first light shaft 18 and the light source 15 is a sector disc 30, having a plurality of blades and attached to the shaft 25, which is suitably of the form shown in FIG. 4. Due to the rotation of the sector disc 30 an intermittent screening of the light bundle or ray from the light source 15 towards the mirror 19 is achieved, and thus the generation of a pulsing light flow. Furthermore, a sensing device 31 is arranged to sense the partial screening of the light source 15. The blades of the pump are mounted so that they are masked by the wings of the sector disc 30.

In FIG. 2, only one blade 26 is shown, but as noted above, more than one blade could be employed. Since the blade or blades 26 are mounted on the same rotatable shaft 25 as the sector disc 30, the relationship between the blade 26 and the disc is fixed so that a wing of the disc is vertically directly above the blade. That is, a wing of the sector disc always optically covers the blade 26 so that the passage of the blade through the path followed by the light cannot interfere with measurement. Whenever the blade 26 is in the light path, a wing of the sector disc is also in the light path. When a blade 26 is in the position shown in FIG. 2, a wing of the sector disc 30 is blocking light from passing downward from the source 15, so no light is interrupted by the blade.

FIG. 4 shows a block diagram of the measuring principle itself. When the sector disc 30 rotates a pulsing light flow is produced which, via the mirrors 19 and 20, is brought to pass the liquid in the measuring gap 4. The light flow to the photo element 21 thus changes from zero to a level corresponding to the quantity of particles in the liquid. At the same time as the sector disc 30 rotates and effects a pulsing light flow, the sensing device 31, which is placed at an angle of 120° to the light, senses when the light bundle is screened off.

The angular relationship between the light source 15 and the sensing device 31 is shown in FIG. 4. As clearly shown the three wings of the disc 30 are equally angularly spaced, so that the leading edge of each wing is at an angle of 120° with the leading edge of each of the other wings. Since the sensing device 31 must determine when the leading edge of a wing of the disc begins to pass through the light path, the device 31 is positioned at an angle of 120° with respect to the light source 15 in relation to the axis of rotation of the disc. Thus when the edge of one wing moves into the light path, the edge of another wing moves to the sensing device and is detected.

A voltage difference arises in the circuit because the wings of the sector disc interrupt the light beam travelling to the photo detector 21, whereby the voltage generated at the photo detector varies periodically. The sensing device 31, as aforementioned, is positioned to detect the presence or absence of a disc wing at the device 31, which indicates that another wing of the disc, spaced 120° from the wing sensed is passing in front of the light source. The sensing device 31 may be any of numerous conventional devices capable of sensinG the presence of an object and passing an electrical signal to a synchronizing device 32 which then feeds a control signal for operating the relay $R_L$. As shown in FIG. 2, the sensing device 31 comprises two elements, viz. one transmitter and one detector, as will be understood by those familiar with this art. As shown in the drawinG the gap between the two elements of the sensing device 31 receives the wings of the disc 30 as the disc rotates. Thus, when the gap between the elements of the sensing device is occupied by a wing of the sector disc 30, the device senses the presence of the wing and transmits a signal to the synchronizing device 32, the device 32 passes on the signal to the coil of relay $R_L$ and the relay is switched over so that the measuring signal from the photo detector 21 (via the amplifier 33) is fed to the appropriate input circuit of the bridge 34. The signal to the bridge 34 like the bridge 5 in FIG. 1 is stored in either capacitor $C_1$ or $C_2$ depending on whether the sector disc is at that instant blocking or not blocking the path of the light beam to the photo detector. Since the voltage from the photo detector 21, via the amplifier 33, is different depending on whether the light beam is: (a) blocked by a wing of the sector disc 30; or (b) permitted to pass unobstructed to the photo detector 21, there will be differing charges on the respective capacitors $C_1$ and $C_2$, proportional to the different voltages. The measuring bridge 34 thus has two bridge parts, i.e. a lefthand bridge part for dark current (i.e. the current flowing when the path of the light beam to the photo detector 21 is blocked by one of the wings of the sector disc 30) and a righthand bridge part for measuring current flowing when the light beam is unobstructed. The voltage difference arising in the bridge is measured in a final amplifier 35 which emits a signal to indicate and regulate the depth of the plunger to a level corresponding to the sedimentation content set in advance on the regulator 6.

The voltage difference represented by the respective charges on the capacitors $C_1$ and $C_2$ is detected by the amplifier 35 and passed from the amplifier 35 to the regulator 6 shown in FIG. 1. This measured or "actual" voltage is compared with a reference voltage by the regulator 6 to determine whether the device should be raised or lowered in the liquid media to match the actual to the desired voltage. It should be remembered that the measured, actual voltage represents the light transmitting capacity of the medium since it is determined by passage of light through a sample of the medium to the photo detector 21.

As indicated in the foregoing discussion of FIG. 1, the plunger 1 of the invention is automatically raised or lowered to follow the level at which there is a certain amount of sedimentation. For this purpose a signal is passed by the regulator 6 of FIG. 1 to the positioning motor 7. As previously stated the differential bridge with its measuring amplifier (indicated schematically at 5 in FIG. 1 and shown in greater detail in FIG. 4) transmits its signal to the regulator 6 which compares the measurement signal with a preset value.

In the drawing at FIG. 4, the final amplifier of the bridge circuit 5 is shown as connected to a meter, but it will be understood that the amplifier 35 also feeds its measured signal to the regulator 6 as shown in FIG. 1. The regulator 6, after comparing the signal from the amplifier 35 of the circuit 5, then transmits a signal to the positioning motor 7, which turns the cable drum 8. The zero value of the device is adjusted by the adjusting resistor $R_2$ if the liquid in the measuring gap 4 is clear and the measuring region is adjusted by the adjusting resistor $R_1$.

It will be clear to those of ordinary skill in the art that in the measuring bridge 34, the components $C_1$, $R_4$ and $R_5$, like the components $C_2$, $R_2$ and $R_3$, represent capacitative storages of the bridge, wherein $C_1$ and $C_2$ provide the store function in their respective sides of the bridge and the resistance chains $R_4 + R_5$ and $R_2 + R_3$ provide the respective loads required in order to obtain a suitable time constant for the storages. The resistance $R_2$ is used with $R_1$ to adjust "zero" and the measuring range of the amplifier 35. The amplifiers 33 and 35 and the synchronizing device 32 are shown with similar marking symbols since they are similar elements in their function of passing on electrical signals. The choice of suitable resistors, capacitors and amplifiers will be obvious to those conversant with electronics.

The regulator 6 can be a conventional regulator capable of comparing an input signal from the amplifier 35 with a reference signal and passing on a difference signal. As an example, a conventional proportional integrating-differentiating regulator can be used.

It should be obvious that the selection of appropriate components is within the skill of the art, and what is disclosed is a new and useful method and apparatus for determining and following a sedimentation level.

What I claim is:

1. A method of discovering and following the depth of a predetermined sediment content in a liquid comprising: immersing a measuring device in a liquid and allowing liquid, the sediment content of which is to be examined, to enter an opening in the device; directing light from a light source in the device on to the liquid in said opening; determining the opacity of the liquid by means of a photo-electric element positioned to respond to light from said light source which has impinged upon the liquid in said opening; comparing an electrical signal from said photo-electric element corresponding to the opacity of the liquid with a reference value corresponding to a predetermined sediment content to produce a direction signal representing the difference between the measured opacity and that of the predetermined sediment content; and using said direction signal to actuate means for adjusting the depth of immersion of the measuring device and to maintain the measuring device at a depth whereat the measured opacity corresponds to that of the predetermined sediment content of the reference value.

2. Apparatus for discovering and following the depth of a predetermined sediment content in a liquid, the apparatus comprising a measuring device for immersion in the liquid for continuous measurement of the sediment content thereof, the device including a light source, an opening for receiving the liquid and a photoelectric element connected to comparator means, the photoelectric element and the light source being arranged to co-operate to measure the opacity of liquid when such liquid is disposed in the opening, amplifier means for amplifying the output of said photo-electric element to produce a measurement voltage representative of the measured opacity and means for feeding said measurement voltage to the comparator means, a source of a reference voltage corresponding to the opacity of a predetermined sediment content and means for feeding said reference voltage to the comparator means for comparison of the reference voltage with the measurement voltage and for the output by the comparator of a difference signal corresponding to the difference between the reference and measurement voltages, means for feeding said difference signal to means for raising and lowering the measuring device and arranged to be controlled by said difference signal continuously to maintain the measuring device at the depth of said predetermined sediment content.

3. Apparatus as claimed in claim 2, in which the raising and lowering means comprises a cable drum carrying a cable from which the measuring device is suspended, the cable serving to carry current for feeding the light source and the comparator.

4. Apparatus as claimed in claim 2, in which the measuring device comprises a pump for forcing liquid, when the device is immersed therein, into the opening, the pump having a flexible blade arranged to wipe opposed light conducting walls of the opening.

5. Apparatus as claimed in claim 2, in which the measuring device comprises a rotatable plate disposed between the light source and the photoelectric element, for intermittently interrupting the passage of light rays from the light source to the photoelectric element.

6. Apparatus as claimed in claim 2, in which light source and the photoelectric element are disposed on the same side of the opening, mirrors on the opposite side of the opening serving to direct light rays from the light source to the photoelectric element via the opening.

* * * * *